United States Patent
Goldberg (12)

(10) Patent No.: US 6,450,130 B1
(45) Date of Patent: Sep. 17, 2002

(54) MULTIUSE SAFETY RESTRAINT FOR PETS AND METHOD OF CONSTRUCTION

(76) Inventor: Carl L. Goldberg, 946 Vetch Cir., Lafayette, CO (US) 80026

( * ) Notice: Subject to any disclaimer, the term of this patent is extended or adjusted under 35 U.S.C. 154(b) by 0 days.

(21) Appl. No.: 09/662,043

(22) Filed: Sep. 15, 2000

(51) Int. Cl.⁷ .............................................. A01K 27/00
(52) U.S. Cl. ...................... 119/792; 119/771; 119/856
(58) Field of Search ................................ 119/792, 771, 119/856, 905, 293, 858

(56) References Cited

U.S. PATENT DOCUMENTS

| | | | |
|---|---|---|---|
| 1,800,421 A | | 4/1931 | Wickersham et al. |
| 2,187,021 A | | 1/1940 | Everson |
| 2,605,744 A | | 8/1952 | Urbanski |
| 2,826,172 A | * | 3/1958 | Buckle et al. ............... 119/792 |
| 3,310,034 A | | 3/1967 | Dishart |
| 3,948,222 A | | 4/1976 | Longshore et al. |
| 4,512,286 A | | 4/1985 | Rux |
| 4,655,172 A | * | 4/1987 | King ........................... 119/792 |
| 4,676,198 A | | 6/1987 | Murray |
| 4,715,618 A | * | 12/1987 | Harris ......................... 119/771 |
| 4,896,630 A | | 1/1990 | Luce |
| 4,907,541 A | | 3/1990 | Thompson |
| 4,970,991 A | | 11/1990 | Luce |
| 5,035,203 A | | 7/1991 | Cardenas |
| 5,154,660 A | | 10/1992 | Snyder et al. |
| 5,167,203 A | | 12/1992 | Scott et al. |
| 5,335,627 A | * | 8/1994 | Bandimere ................... 119/856 |
| 5,359,964 A | | 11/1994 | Sporn |
| 5,427,061 A | | 6/1995 | McCullough |
| 5,443,037 A | | 8/1995 | Saleme |
| 5,511,515 A | * | 4/1996 | Brown et al. ................ 119/771 |
| 5,555,848 A | * | 9/1996 | Trujillo et al. ............... 119/654 |
| 5,676,093 A | * | 10/1997 | Sporn .......................... 119/792 |
| 5,743,216 A | * | 4/1998 | Holt, Jr. ...................... 119/793 |
| 5,794,571 A | | 8/1998 | Goldberg |
| 5,893,339 A | * | 4/1999 | Liu .............................. 119/770 |
| 5,915,335 A | * | 6/1999 | Holt, Jr. ...................... 119/770 |
| 6,161,505 A | * | 12/2000 | Noguero ...................... 119/792 |

* cited by examiner

*Primary Examiner*—Yvonne R. Abbott
(74) *Attorney, Agent, or Firm*—Harold A. Burdick

(57) ABSTRACT

A safety restraint for pets adapted for multiple uses, including utilization with an existing vehicular seat belt system, and method for constructing the restraint. The restraint includes first and second closed loops formed by a length of webbing joined at its opposite ends and secured at a webbing intersection. Each of the closed loops is characterized by an angular loop segment diverging from the intersection at a fixed angle of less than 90°. Straps releasably associate opposite sides of the loops, and connecting bands at the loops are adapted to be releasably linked with each other. A tether strap is connected with the one of the bands, a securement being provided to receive and secure the tether strap. A buckle set at the first and second closed loops adjacent to the connecting bands may be engaged to secure the relative positions of the loops when the pet is free running.

20 Claims, 2 Drawing Sheets

MULTIUSE SAFETY RESTRAINT FOR PETS AND METHOD OF CONSTRUCTION

FIELD OF THE INVENTION

This invention relates to pet restraining apparatus and methods, and, more particularly, relates to pet restraints and harnesses adaptable for use with vehicle seat belt systems.

BACKGROUND OF THE INVENTION

Restraining devices for pets adapted for use in vehicles to restrain the pet in case of accident or the like (in conjunction with the existing seat belt restraints in the vehicle), for use with leashes or tethers, or for use as general wear harnesses in particular applications are now known and/or utilized (see, for example, U.S. Pat. Nos. 5,794,571, 5,359,964, 5,427,061, 4,896,630, 5,146,660, 5,443,037, 4,676,198, 2,605,744, 2,187,021, and 1,800,421).

Such heretofore known and/or utilized pet safety restraints and harnesses are generally primarily adapted for a single use and have thus proven ill suited to the pet outside of the specific intended application (and particularly if the animal is free running). The single use nature (i.e., practically usable only for vehicle restraint, for example) of some such devices, the complexity of others, the expense of many such restraints, failure of adequate fit and/or secureness on the animal of particular devices, and a perception by both the user and the animal of discomfort of some devices when applied may be at least in part to blame for a lack of acceptance, particularly in the field of pet vehicle safety belt harnesses.

In application, some heretofore known pet restraints (or harnesses) are less than totally effective and/or tend to be used in a manner which could do more harm than good when subjected to sudden restraining forces (for example, applying choking, twisting or other potentially harmful forces at the animal's neck area, and/or otherwise failing to provide proper impact support for, or security and/or fit on, the animal). Moreover, assuring that a harness remains secured on a specific animal without necessity of producing an excessive numbers of harness sizes and/or models for different sizes and breeds of animal, and with securement being assured without regard to particular application (whether the animal is leashed, tethered, or free running), has not yet been adequately addressed. Finally, adequacy of materials, harness design and component securement, particularly at key segments or connections of a pet vehicular restraint system used with the vehicle's safety belt system, have not heretofore proven totally satisfactory. Further improvements could thus still be utilized.

SUMMARY OF THE INVENTION

This invention provides a multiuse safety apparatus and method for restraint of pets whether riding in vehicles (utilizing the safety belts found in most modern motor vehicles), leashed or tethered, while allowing continued wear by the animal when running free without concern that the apparatus will become dislodged from the animal or entangled as the animal moves about. The pet safety restraint of this invention is relatively inexpensive to produce, is easy to apply on the animal and within a vehicle, and is secure and comfortable on the animal.

The restraint of this invention will remain secured on a specific animal without necessity of producing an excessive numbers of sizes and/or models for different sizes and breeds of animal, securement being assured without regard to particular application (whether the animal is leashed, tethered, or free running). Materials, restraint design and component securement is improved, particularly at key segments used in a pet vehicular restraint system applied with the vehicle's safety belt system.

The safety restraint includes first and second closed loops formed by a length of webbing joined at opposite ends and secured at a webbing intersection, the closed loops each extending from the intersection and characterized by an angular loop segment diverging from the intersection at a fixed angle of less than 90° (for example, between about 250 and 750, and most preferably less than 50°).

First and second straps are connected at the first and second closed loops spaced from the intersection. The first strap is adapted for releasably associating opposite sides of the first closed loop and the second strap is adapted for releasably associating opposite sides of the second closed loop. First and second connecting bands at the first and second closed loops spaced from the intersection are adapted to be releasably linked with each other.

The second connecting band forms a securing loop extending from the second closed loop a distance no more than about three times the width of the webbing thereat. The securing loop is maintainable by the first connecting band and receives a vehicle seat belt therethrough. The first connecting band is connected to the webbing at the first closed loop so that, in combination with the webbing thereat, a receiving loop for receipt of the securing loop is defined.

The second connecting band has a tether strap connected therewith, a ring connector preferably provided at a free end thereof thereof. A securement at the second closed loop releasably receives and secures the tether strap when the animal is free running. A buckle set at the first and second closed loops adjacent to the securing loop and the receiving loop is provided to selectively establish relative location of the first and second closed loops thereat providing added security of the restraint on the animal when the animal is off leash.

The method for constructing a multiuse vehicular safety restraint for pets of this invention includes the steps of permanently joining a length of webbing at opposite ends thereof to form an endless belt and permanently joining opposite sides of the endless belt to one another at an intersection so that first and second closed loops are defined in the endless belt. The intersection is joined so that each of the closed loops is characterized by an angular loop segment diverging from the intersection at a fixed angle of less than 90°. Means are secured at the closed loops for associating the closed loops and receiving the vehicle safety belt.

It is therefore an object of this invention to provide a multiuse pet safety restraint adapted for use with a vehicle safety belt, a leash or tether while allowing continued wear by the animal when running free, and restraint construction method.

It is another object of this invention to provide a multiuse pet safety restraint that is relatively inexpensive to produce, is easy to apply on the animal and within a vehicle, and that is secure, safe and comfortable on the animal.

It is still another object of this invention to provide a multiuse safety restraint for pets including a harness that will remain secured on a specific animal without necessity of producing an excessive numbers of harness sizes and/or models for different sizes and breeds of animal, where securement is assured without regard to particular application (whether the animal is leashed, tethered, or free running), and which utilizes improved materials, harness design and component securement, particularly at key segments used in a pet vehicular restraint system applied with the vehicle's safety belt system.

It is yet another object of this invention to provide a safety restraint for pets including first and second closed loops formed by a length of webbing joined at opposite ends and secured at a webbing intersection thereby defining the closed loops each extending from the intersection, the webbing secured at the intersection so that each of the closed loops is characterized by an angular loop segment diverging from the intersection at a fixed angle of less than 90°, first and second straps connected at the first and second closed loops, respectively, spaced from the intersection, the first strap adapted for releasably associating opposite sides of the first closed loop and the second strap adapted for releasably associating opposite sides of the second closed loop, and first and second connecting bands at the first and second closed loops, respectively, spaced from the intersection and adapted to be releasably linked with each other.

It is yet another object of this invention to provide a safety restraint for pets including first and second closed loops formed by a length of webbing joined at opposite ends and secured at a webbing intersection thereby defining the closed loops each extending from the intersection, the webbing secured at the intersection so that each of the closed loops is characterized by an angular loop segment diverging from the intersection at a fixed angle of between about 25° and 75° (and, more preferably, at a fixed angle of less than about 50°).

It is yet another object of this invention to provide a safety restraint for pets including first and second closed loops formed by a length of webbing joined at opposite ends and secured at a webbing intersection, and first and second connecting bands, the second connecting band forming a securing loop extending from the second closed loop a distance no more than about three times the width of the webbing thereat, the securing loop maintainable by the first connecting band and adapted for receiving a vehicle seat belt therethrough.

It is still another object of this invention to provide a multiuse vehicular safety restraint for pets adapted for use with both vehicle safety belts and leashes while being safe for continued wear by a free running pet, the restraint having a webbing forming an endless belt, opposite sides of the endless belt permanently joined to one another at a position selected so that first and second closed loops are defined in the endless belt, a securing loop extending from the second closed loop and adapted for receiving a vehicle seat belt therethrough, a connecting band connected to the webbing at the first closed loop so that the connecting band and the webbing thereat together define a receiving loop for receipt therethrough of the securing loop, a tether strap connected with the securing loop and having a leash attachment locus adjacent to a free end thereof, a securement at the second closed loop spaced from the securing loop and configured to releasably receive and secure the tether strap thereat, and engageable means at the first and second closed loops adjacent to the securing loop and the connecting band to selectively establish relative location of the first and second closed loops thereat.

It is still another object of this invention to provide a method for constructing a multiuse vehicular safety restraint for pets adapted for use with both vehicle safety belts and leashes while being safe for continued wear by a free running pet, the method including the steps of permanently joining a length of webbing at opposite ends thereof to form an endless belt, permanently joining opposite sides of the endless belt to one another at an intersection so that first and second closed loops are defined in the endless belt with each of the closed loops characterized by an angular loop segment diverging from the intersection at a fixed angle of less than 90°, and securing means at the closed loops configured for associating the closed loops and receiving the vehicle safety belt.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
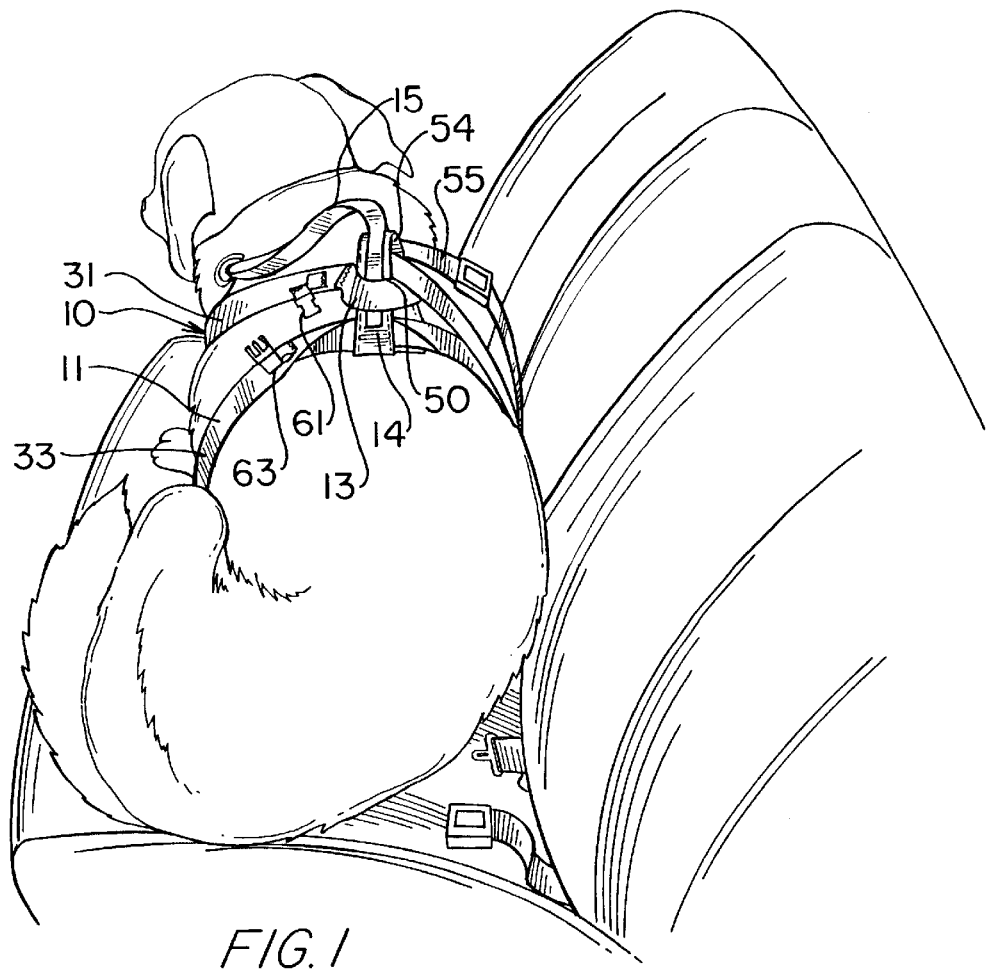
FIG. 1 is a perspective view illustration of the pet restraint of this invention in use for securing a pet in a vehicle.
Figure 2:
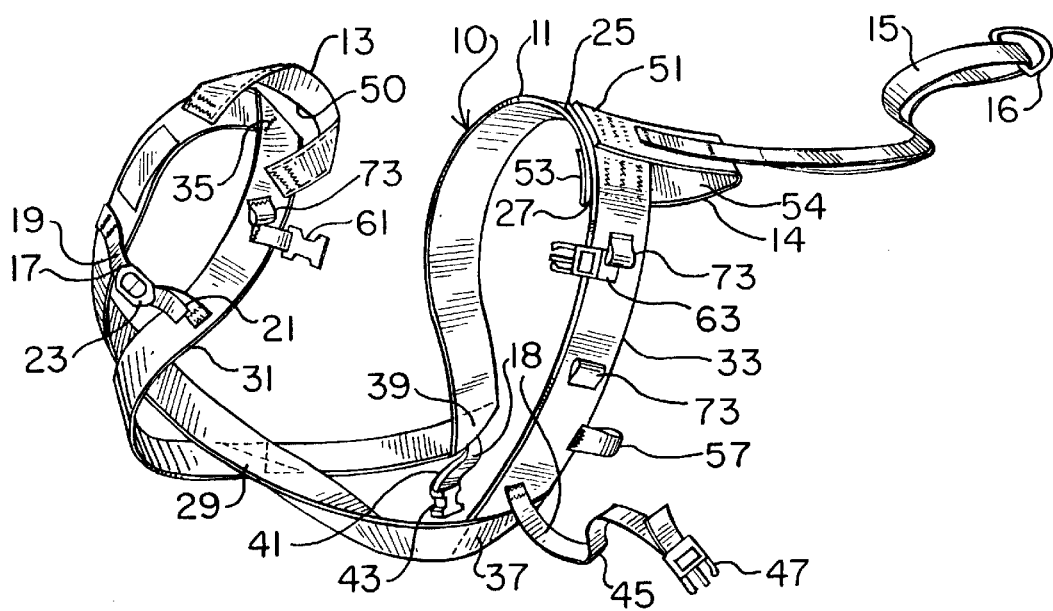
FIG. 2 is a perspective view of the pet restraint shown in FIG. 1.

The multiuse vehicular safety restraint for pets of this invention is illustrated in FIGS. 1 through 4. The restraint includes harness 10 having harness body 11 and connecting bands 13 and 14, tether 15 having leash or tether line attachment locus (a d-ring) 16 at the free end thereof, breast strap set 17, and abdominal strap set 18.

Breast strap set 17 includes first and second straps 19 and 21 and nylon or carbon plastic connecting buckle 23 permanently attached at strap 19 and adjustably receiving strap 21 through slots, as is known for webbing securements.

Harness body 11 is formed of a length of webbing (preferably 1.75" nylon webbing having 6,000 to 10,000 pound load bearing strength) joined at opposite ends 25 and 27 to form an endless belt. The endless belt is joined at an intermediate position (by overlapping the webbing thereat in a figure-eight-type arrangement) and secured at a selected engagement angle at intersection 29 to form first and second closed loops 31 and 33, loop 31 being received over the animal's head and around the neck/breast area, and loop 33 being received behind the animal's forelegs and across and around the animal's torso. The webbing material has folds 35, 37 and 39 formed and secured therein to shape the harness by angularly redirecting the belt at the folds.

Abdominal strap set 18 is provided for associating opposite sides of closed loop 33, thus providing securement and fit adjustment. Strap set 18, like breast strap set 17, includes strap 41, having female buckle segment 43 linked thereto, and strap 45 having male buckle segment 47 adjustably therealong. Strap 41 is connected with harness body 11 at or adjacent to fold 39, and strap 45 is connected with harness body 11 at or adjacent to fold 37. Strap sets 17 and 18 allow for the association of the opposing sides of their respective closed loops to achieve fine adjustment of securement and fit of a harness body 11 of a standardized size on animals of varying sizes within the range of the standardized size (utilizing, for example, standardized sizes extra-small, small, medium and large).

Figure 3:
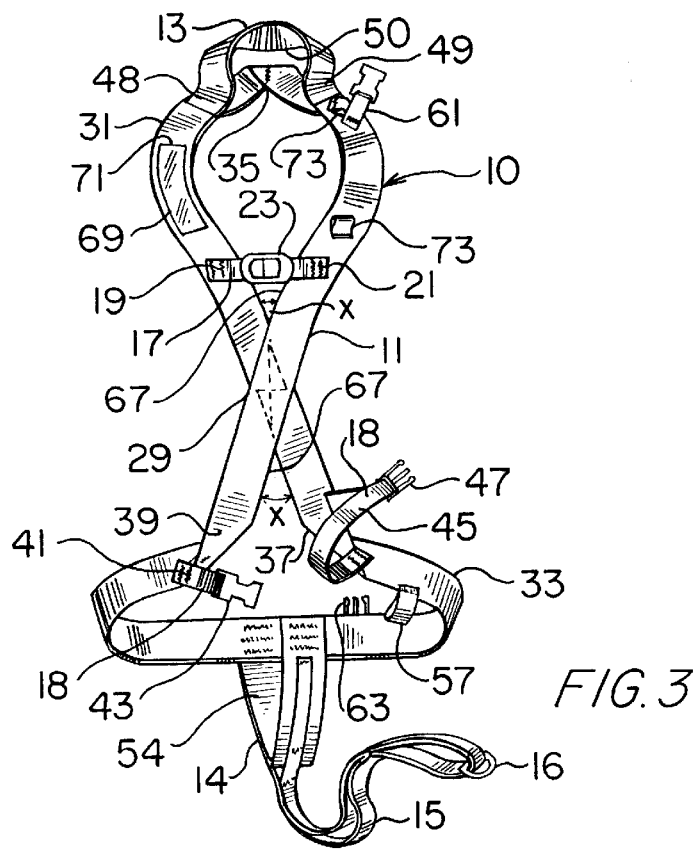
FIG. 3 is another view of the pet restraint shown in FIGS. 1 and 2.

Connecting band 13 is formed of a length of webbing (preferably of the same size and load strength as harness body 11) secured to harness body 11 at its ends 48 and 49 adjacent to fold 35 (see FIG. 3). Band 13 and webbing of body 11 thereat together form receiving loop 50 for receipt of connecting band 14 and tether 15 therethrough, with loop 50 providing a relatively close fit.

Connecting band 14 is also preferably made of material having a similar size and load strength as the webbing of harness body 11 and is formed by a length of webbing secured to harness body 11 at its ends 51 and 53 (see FIG. 2) adjacent to the interconnection of opposite ends 25 and 27 (one end above and one end below the interconnection) of the webbing of harness body 11 thus defining a securing loop 54 receivable through receiving loop 50 and adapted to receive a seat belt therethrough (55 of FIG. 1). Securing loop 54 extends from closed loop 33 a distance no more than about three times (preferably 2.5 to 3 times) the width of the webbing of harness body 11 thereat. In this way, when engaged by a seat belt, and in combination with the close fit of receiving loop 50, travel of the animal thus secured is significantly limited during an accident or sudden stop thereby better protecting the animal and others in the vehicle (for example, front seat passengers if the pet is secured in a rear seat).

Tether 15 is formed of a length of webbing (which need not be as strong or substantial as the harness components) sewn or otherwise secured to band 14 to form a loop. Tethering or leash connecting locations such as ring 16 may be provided. The opposite sides of the loop thus formed for tether 15 may also be secured together at intermediate positions therealong to define plural selected attachment loci at the free end of tether 15.

In use, harness body 11 is applied to the animal as discussed above and shown in FIGS. 1 and 4. Securing loop 54 of band 14 and tether 15 are laced through receiving loop 50, and strap sets 17 and 18 are buckled and tightened to a secure but comfortable fit. Tether 15 may serve much as the manually held end of a leash before entry and after exit of the animal from a vehicle or may be used as a lead for a tether line or leash. In a vehicle, the vehicle seat belt (lap belt 55 or a shoulder/lap belt combination) is laced through securing loop 54 at the portion extending through receiving loop 50 and engaged with its mating buckle.

Figure 4:
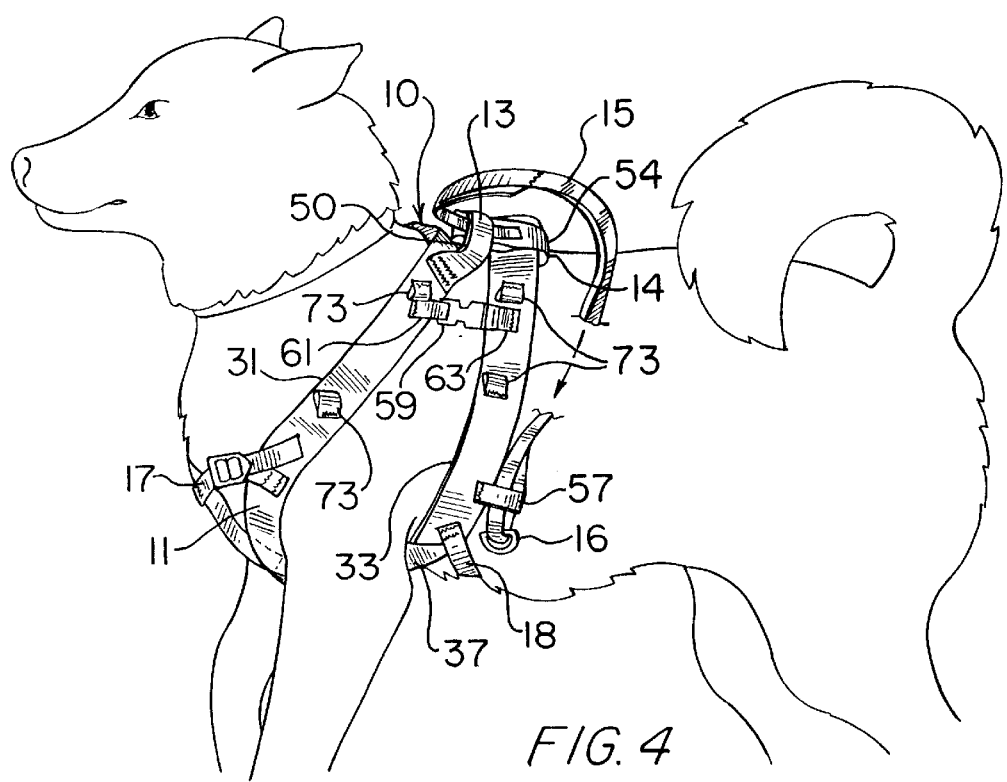
FIG. 4 is an illustration of the pet restraint of FIGS. 1 through 3 secured on a free running animal.

When the animal is in no way tethered or leashed (i.e., free running as shown in FIG. 4), tether securement 57 is provided to receive tether 15 therethrough to assure that it doesn't snag or otherwise injure the animal as it moves about. To assure harness 10 stays securely on the animal when no tension is applied at connecting bands 13 and 14, buckle set 59, including female buckle and strap segment 61 and fixed length or length adjustable male buckle and strap segment 63, is provided to secure the relative positions of closed loops 31 and 33 adjacent to bands 13 and 14.

The restraint of this invention is constructed by first providing a single length of webbing selected for a particular size category. At approximately the midspan of the length of webbing, the webbing is folded over and secured (by stitching, heat welding, gluing, or a combination thereof, for example) to form fold 35. Using a 1.75' webbing, for example, the fold is formed along a span selected to accommodate the interface angle of the overlapped webbing a intersection 29 as set forth hereinafter.

The webbing is lapped over itself at an intermediate position (a selected length on each opposite sided from fold 35) and secured at intersection 29 thereat to thereby form closed loop 31. Each side of the webbing extending from intersection 29 has a fold formed therein, folds 37 and 39 being secured in the same manner as fold 35. Folds 37 and 39 redirect the webbing outwardly thereat and are formed along a span selected for proper position of securing loop 54 adjacent to receiving loop 50 when the restraint is fitted to an animal in the particular size category. Ends 25 and 27 of the webbing are then overlapped (about a 1.75") and secured providing an endless belt (again utilizing the methods above discussed) and thus forming closed loop 33 of harness body 11.

The overlap at intersection 29 is significant for proper fit of the apparatus of this invention to a wide variety of specific animals within a size category. Heretofore known devices have been found to be easily snagged as the animal moves about and/or can be dislodged from the animal (or easily escaped from by the animal) when a 90° interface is used at intersection 29. To avoid this and provide a more comfortable and secure fit, it has been found that the webbing should be secured at intersection 29 so that each of the closed loops 31 and 33 is characterized by an angular loop segment 67 (see FIG. 3) diverging from intersection 29 at a fixed angle X of less than 90° (for example, between 25° and 75°, and preferably less than 50°, a 30° angle being illustrated herein and found particularly adaptable).

Connecting bands 13 and 14 and tether 15 are connected, as discussed above. Strap and buckle sets 17, 18 and 59 are connected with the webbing by stitching or the like and securement 57 is sewn (utilizing a loop of nylon material) in place. A clear faced pocket 69 having an open end 71 is established at a surface of the webbing at loop 31 to carry tags, identifying indicia or the like associated with the animal wearing the harness. Ancillary equipment (such as packs, water bottles or the like) may be carried by the animal wearing the harness by attachment thereof at securement interface loops 73 sewn to harness body 11 at one or both sides of one or both of closed loops 31 and 33 (see FIG. 4).

Materials and connections discussed above should be calculated to provide in excess of about 5,000 pounds of load at all points along the webbing (and preferably about 6,000 pounds or more) so that, in use, accident forces can be predictably resisted. If stitching is utilized at least in part for the various connections, fold securements and the like, 69 to 92 weight nylon thread and, particularly at potentially high stress connections between harness body 11 and connecting bands 13 and 14, multiple stitch bars, horizontal and/or vertical, should be utilized. Nylon webbing material used in the harness body and connecting bands is preferably about a 10,000 pound, or greater, test material. Reflective cloth tape may be applied and secured at all or selected portions of the outward surfaces of closed loops 31 and 33 and tether 15 to provide greater night visibility.

As may be appreciated from the foregoing, an improved and highly versatile pet restraint for use with vehicular seat belt systems, tethers and leashes is provided which is made safe, secure and comfortable for continued wear by a free running pet. By carefully selecting interface angles of webbing utilized, fit and security of the restraint are greatly improved. Vehicle safety is optimized by carefully controlling seat belt connections at the restraint to limit potential travel length of the animal in the vehicle in case of accident or other sudden stop.

What is claimed is:

1. A safety restraint for pets comprising:
   first and second closed loops formed by a length of webbing joined at opposite ends and secured at a webbing intersection thereby defining said closed loops each extending from said intersection, said webbing secured at said intersection so that each of said closed loops is characterized by an angular loop segment diverging from said intersection at a fixed angle of less than 90°;
   first and second straps connected at said first and second closed loops, respectively, spaced from said intersection, said first strap adapted for releasably associating opposite sides of said first closed loop and said second strap adapted for releasably associating opposite sides of said second closed loop; and
   first and second connecting bands at said first and second closed loops, respectively, spaced from said intersection and adapted to be releasably linked with each other.

2. The safety restraint of claim 1 wherein said fixed angles of said angular loop segments of said first and second closed loops are between about 25° and 75°.

3. The safety restraint of claim 1 wherein said second connecting band forms a securing loop extending from said second closed loop a distance no more than about three times the width of said webbing thereat, said securing loop maintainable by said first connecting band and adapted for receiving a vehicle seat belt therethrough.

4. The safety restraint of claim 3 wherein said first connecting band is connected to said webbing at said first closed loop so that said first connecting band and said webbing thereat together define a receiving loop for receipt therethrough of said securing loop.

5. The safety restraint of claim 1 wherein said first and second connecting bands and said webbing are of similar width and load strength material.

6. The safety restraint of claim 1 further comprising a tether strap connected with said second connecting band and having a ring connector at a free end thereof.

7. A multiuse vehicular safety restraint for pets adapted for use with both vehicle safety belts and leashes while being safe for continued wear by a free running pet, said restraint comprising:
   a webbing forming an endless belt, opposite sides of said endless belt permanently joined to one another at a position selected so that first and second closed loops are defined in said endless belt;
   a securing loop extending from said second closed loop and adapted for receiving the vehicle seat belt therethrough;
   a connecting band connected to said webbing at said first closed loop so that said connecting band and said webbing thereat together define a receiving loop for receipt therethrough of said securing loop;
   a tether strap connected with said securing loop and having an attachment locus adjacent a free end thereof;
   a securement at said second closed loop spaced from said securing loop and configured to releasably receive and secure said tether strap thereat; and
   engageable means at said first and second closed loops adjacent to said securing loop and said connecting band to selectively establish relative location of said first and second closed loops thereat.

8. The safety restraint of claim 7 further comprising a breast strap set connected at said first closed loop adapted for releasably associating opposite sides of said first closed loop, and a second strap set connected at said second closed loop adapted for releasably associating opposite sides of said second closed loop.

9. The safety restraint of claim 7 further comprising first and second permanently secured folds formed in said webbing, one each at opposite sides of said second closed loop and spaced from said position, and a third permanently secured fold formed in said webbing at said first closed loop opposite said position, said first, second and third folds angularly redirecting said endless belt thereat.

10. The safety restraint of claim 7 further comprising a pocket formed at a surface of said webbing at said first closed loop.

11. The safety restraint of claim 7 further comprising ancillary equipment securement interfaces secured to said webbing at either or both of said first and second closed loops.

12. The safety restraint of claim 7 wherein said webbing is joined at said position so that each of said closed loops is characterized by an angular loop segment diverging from said position at a fixed angle of between about 25° and 50°.

13. A method for constructing a multiuse vehicular safety restraint for pets adapted for use with both vehicle safety belts and leashes while being safe for continued wear by a free running pet, said method comprising the steps of:
   permanently joining a length of webbing at opposite ends thereof to form an endless belt;
   permanently joining opposite sides of said endless belt to one another at an intersection so that first and second closed loops are defined in said endless belt with each of said closed loops characterized by an angular loop segment diverging from said intersection at a fixed angle of less than 90°; and
   securing means at said closed loops configured for associating said closed loops and receiving the vehicle safety belt.

14. The method of claim 13 wherein said fixed angles of said angular loop segments of said first and second closed loops are between about 25° and 75°.

15. The method of claim 13 wherein the step of securing means at said closed loops configured for associating said closed loops and receiving the vehicle safety belt further includes forming a securing loop to said webbing at said second closed loop so that said securing loop extends from said second closed loop a distance no more than about three times the width of said webbing thereat and is adapted for receiving the vehicle seat belt therethrough.

16. The method of claim 15 wherein the step of securing means at said closed loops configured for associating said closed loops and receiving the vehicle safety belt includes connecting a band to said webbing at said first closed loop so that said band and said webbing thereat together define a receiving loop for receipt therethrough of said securing loop.

17. The method of claim 16 further comprising the step of securing a tether strap having a ring connector at a free end thereof with said securing loop.

18. The method of claim 13 further comprising the step of securing engageable means at said first and second closed loops adjacent to said means at said closed loops configured for associating said closed loops and receiving the vehicle safety belt.

19. The method of claim 13 further comprising the steps of permanently securing first and second folds in said webbing, one each at opposite sides of said second closed loop and spaced from said intersection, said first and second folds angularly redirecting said endless belt thereat, permanently securing a third fold in said webbing at said first closed loop opposite said intersection, said third fold angularly redirecting said endless belt thereat, connecting a breast strap at said first closed loop adjacent to said intersection and thereby releasably associating opposite sides of said first closed loop, and connecting a second strap at said second closed loop adjacent to said first and second folds and thereby releasably associating opposite sides of said second closed loop.

20. The method of claim 13 wherein the step of securing means at said closed loops further includes forming a securing loop including a tether strap at said second closed loop, the method further comprising the step of configuring a securement at said second closed loop spaced from said securing loop for releasably receiving and securing said tether strap thereat.

* * * * *